United States Patent

Rohwein

[11] Patent Number: 5,753,126
[45] Date of Patent: May 19, 1998

[54] SYSTEM FOR INCREASING CORONA INCEPTION VOLTAGE OF INSULATING OILS

[75] Inventor: Gerald J. Rohwein, Albuquerque, N. Mex.

[73] Assignee: Sandia Corporation, Albuquerque, N. Mex.

[21] Appl. No.: 799,207

[22] Filed: Feb. 13, 1997

Related U.S. Application Data

[63] Continuation-in-part of Ser. No. 496,552, Jun. 29, 1995, abandoned.

[51] Int. Cl.$^6$ .......................... B01D 19/00; B01D 43/00
[52] U.S. Cl. .......................... 210/748; 210/774; 210/805; 210/808; 208/179; 208/184; 95/266; 204/559
[58] Field of Search .......................... 210/774, 799, 210/805, 808, 748; 208/179, 184; 95/250, 251, 266; 204/559

[56] References Cited

U.S. PATENT DOCUMENTS

| | | | |
|---|---|---|---|
| 3,561,193 | 2/1971 | Baranowski | 95/266 |
| 3,909,383 | 9/1975 | Sato | 210/748 |
| 4,073,720 | 2/1978 | Whisman et al. | 208/184 |
| 4,358,379 | 11/1982 | Inoue | 210/748 |
| 4,978,370 | 12/1990 | Klintenstedt | 95/266 |
| 5,045,179 | 9/1991 | Langhoff et al. | 208/184 |
| 5,211,856 | 5/1993 | Shen | 210/774 |
| 5,306,419 | 4/1994 | Harrison et al. | 208/184 |

FOREIGN PATENT DOCUMENTS

| | | | |
|---|---|---|---|
| 55-94605 | 7/1980 | Japan | 95/266 |
| 2129437 | 5/1984 | United Kingdom | 95/266 |

*Primary Examiner*—Neil McCarthy
*Assistant Examiner*—Theodore M. Green
*Attorney, Agent, or Firm*—George H. Libman

[57] ABSTRACT

The Corona Inception Voltage of insulating oils is increased by repetitive cycles of prestressing the oil with a voltage greater than the corona inception voltage, and either simultaneously or serially removing byproducts of corona by evacuation and heating the oil.

10 Claims, 3 Drawing Sheets

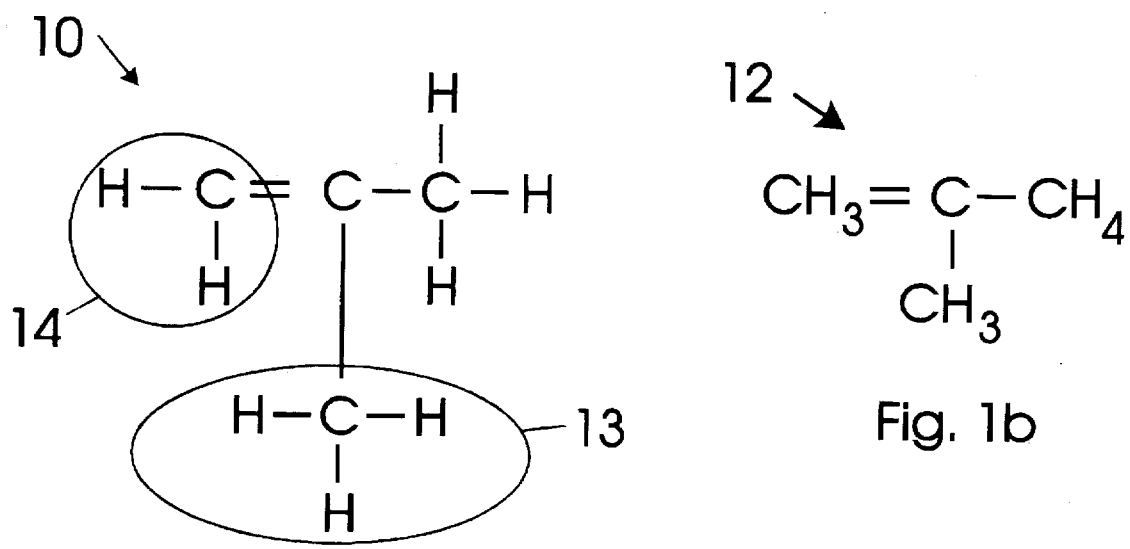
Fig. 1a
Fig. 1b
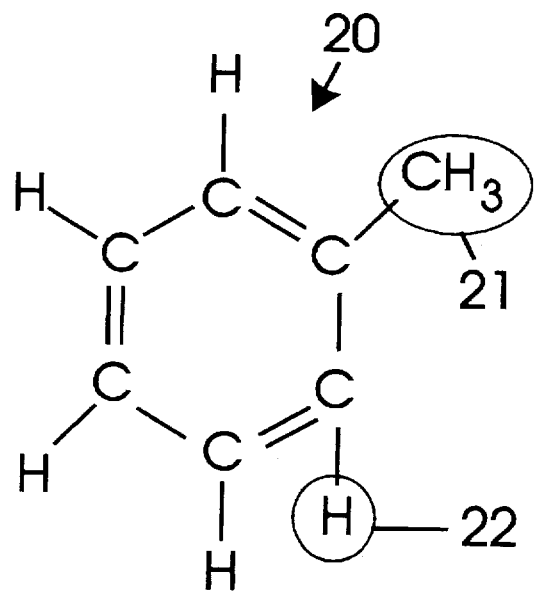
Figure 2

SYSTEM FOR INCREASING CORONA INCEPTION VOLTAGE OF INSULATING OILS

RELATED APPLICATIONS

The invention is a continuation in part of application Ser. No. 08/496,552, filed Jun. 29, 1995, now abandoned.

This invention was made with Government support under Contract No. DE-AC04-AL85000 awarded by the U.S. Department of Energy. The Government has certain rights in this invention.

BACKGROUND OF THE INVENTION

This invention relates generally to an apparatus for increasing the performance of insulating oils used in high voltage, high power applications and thereby increase the service life of these oils. More particularly, the invention demonstrates that by exposing insulating oils to repetitive high voltage shots, the dielectric strength and CIV of the insulating oil is increased.

There are many high voltage, high power applications both at the component and system level that require some form of electrical insulation for proper operation. For example, the performance and the longevity of high voltage components, like capacitors and transformers, are directly related to the quality of the insulation system incorporated. The insulation system chosen for any particular application is chosen to optimize performance and to assure that the integral parts of the component are insulated during high voltage, high power operating conditions.

Generally two types of insulating systems are used: 1) solid fillers and coatings; or 2) liquids, usually oils having high-dielectric strength.

Oil is a very effective insulating medium for filling interstitial spaces between the components as well as impregnating the porous and permeable materials within the components, greatly increasing the dielectric strengths and the corona threshold of the component or system. It is expected by the year 2000 that the demand for new insulating oil will be approximately eighty (80) million gallons per year for high voltage, high power component and system applications. As used herein, new oil is defined as oil being used in components or systems for the first time, while spent oil is oil that has been in use but has not been reprocessed or regenerated.

Insulating oils, like other types of oils, have a limited useful life expectancy. Insulating oils are typically characterized by two properties: Corona Inception Voltage (CIV) and dielectric strength. Both the CIV and the dielectric strength are significantly reduced by the presence of any contamination in the oil. Contamination, whether it be gaseous, moisture, or particulate, increases as oil ages, directly causes degradation of the insulating system, and ultimately can cause a system or component failure.

Several mechanisms, including oxidation, heat, electrical stress, and moisture, are known causes of oil degradation and contamination build-up. Electrically stressing a component or system will cause corona or ionization of the insulating oil to occur. (The terms corona and ionization are used interchangeably throughout). Corona is a luminous discharge attributed to ionization of the media surrounding a conductor having a high voltage gradient. Corona can reduce the dielectric life time and ultimately cause dielectric failure of the insulating oil. High current densities associated with corona result in gasification of the dielectric medium, which in turn decreases the voltage level at which corona or ionization damage begins to occur; e.g., the CIV. Above the CIV, corona is intensified and a decrease in the useful life of the dielectric medium is seen. Below the CIV, corona still occurs, but at a much reduced level. In addition, corona in power components or systems increases exponentially as dielectric strength decreases. At some point, dielectric breakdown, an electrical short circuit through the oil, occurs as a result of corona if the oil is not changed or reprocessed.

Today there are a variety of procedures for testing the level of corona for known contaminants in the oil. One example of a test procedure for corona level, as described in U.S. Pat. No. 4,587,834, only quantifies the level of dissolved gases in the oil. Using results generated from these tests, actual breakdown of the oil is prevented by replacing the oil at a given level of dissolved gases.

Most of the corona by-products are gases and follow the laws of solution whereby they form bubbles and reabsorb depending on the temperature and pressure under which the insulating oil is used. When the solution is near saturation, the gaseous contaminates are easily ionized by an electric field. Consequently, corona activity in electrically stressed oil increases over time if the corona or ionization products are not removed. If the ionization products are not removed from the oil, equipment failure can and will result.

It is known in the art that gaseous contaminates, whether formed by corona or any other means, may be removed from the insulating oil by evacuation or vacuum distillation. Other contaminates such as particulate (carbon) may be removed by filtration. An example of one such process for purifying insulating oil is shown in U.S. Pat. No. 3,561,193 where oil in an operating system is heated, filtered, and vacuumed to remove contaminants. However, there is no teaching in the prior art that repeated applications of the cleaning process may improve the performance characteristics of the oil to better-than-new standards.

SUMMARY OF THE INVENTION

It is an object of this invention to provide a method and apparatus for increasing the CIV of new or spent insulating oils and therefore increase the service life the oil.

It is another object of this invention to induce corona in oil and then clean the oil, and repeat the process to increase the CIV of the oil to greater levels than for new oil.

Additional objects, advantages, and novel features of the invention will become apparent to those skilled in the art upon examination of the following description or be learned by practice of the invention. To achieve the foregoing and other objects, and in accordance with the purpose of the present invention, as embodied and broadly described herein, the present invention comprises a system for increasing the useful life expectancy of insulating oils to be utilized in high voltage, high power apparatuses by exposing insulating oil to a sufficient number of repetitive high voltage shots to form contaminating byproducts, wherein the voltage exceeds the corona inception voltage of the oil; and reprocessing the exposed insulating oil to remove the contaminating byproducts to increase the corona inception voltage of the oil.

BRIEF DESCRIPTION OF THE DRAWINGS

The accompanying drawings, which are incorporated in and form part of the specification, illustrate embodiments of the present invention, and together with the description, serve to explain the principles of the invention.

FIG. 1a shows an example of oil molecule isobutene.

FIG. 1b shows an example of oil molecule 2-methyl propene.

FIG. 2 shows the molecular structure of toluene.

DETAILED DESCRIPTION OF THE INVENTION

Figure 3:
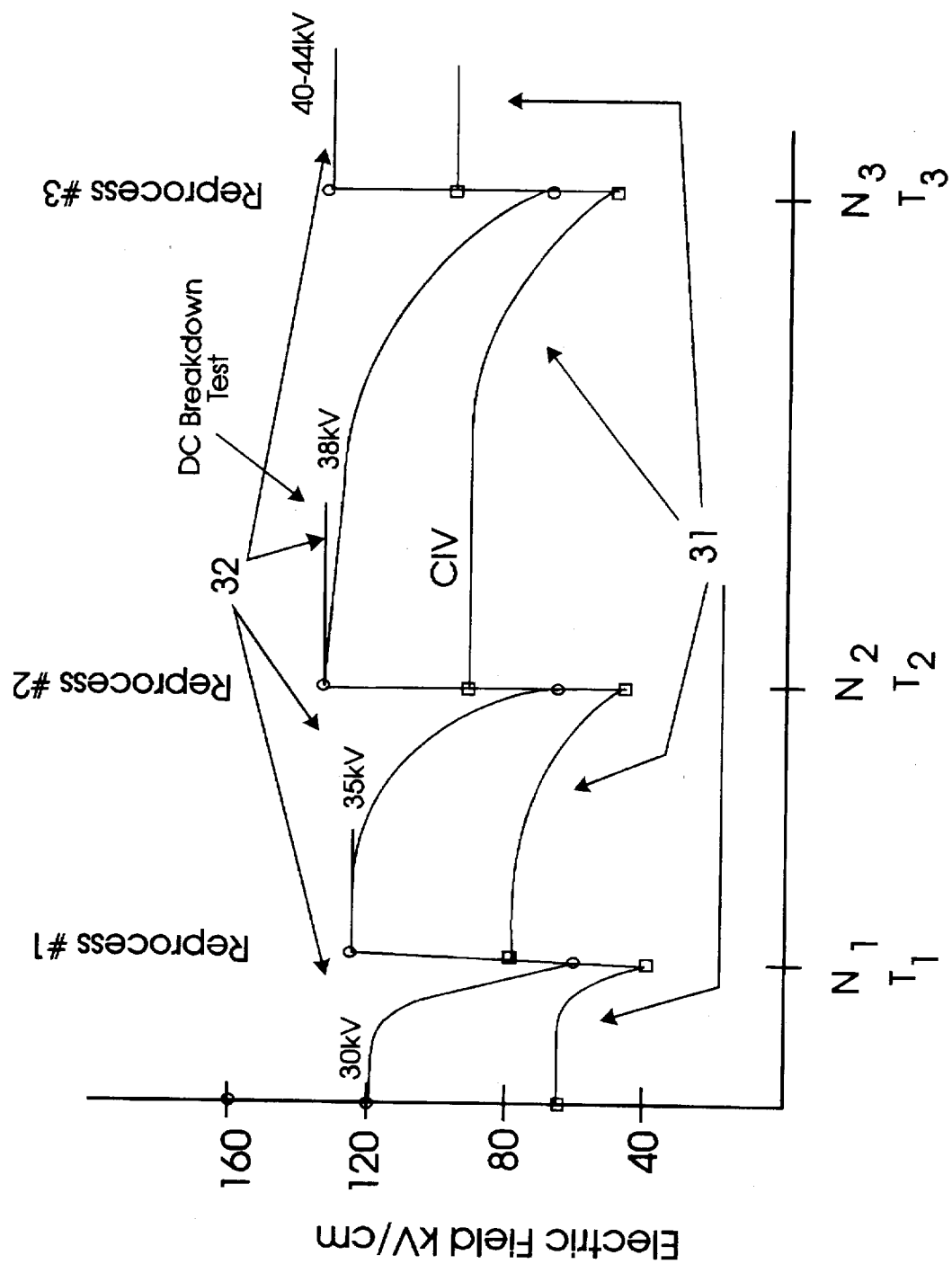
FIG. 3 shows physical properties with reprocessing.

The process of ionization or corona in oils such as electrical or transformer oils is responsible for the degradation and shortened useful life span of millions of gallons of oil every year. The ionization process is not well defined at the molecular level for insulating mediums like oil. One proposed model for describing the ionization process involves the separation, or tearing apart, of oil molecules by forces associated with the electric field insulating oils are subjected to during use. According to this model, the separation of the oil molecule during ionization causes a generation and a build up of gas throughout the oil volume, reducing the tolerance of the oil to ionization and lowering the CIV.

Typical by-products of corona are hydrogen, methane, acetylene, ethylene, carbon, carbon dioxide, carbon monoxide, and moisture. Usually, the ASTM 877 Standard test for electrical breakdown is used to define acceptable levels of contamination for either gaseous or particulate matter in oils. The degree of contamination resident in an oil at a given time can be measured directly with hydrogen or—hydrocarbon detectors if the solubility relationships are known, or indirectly with an AC or DC breakdown test.

Examples of typical oil molecules are shown in FIGS. 1a and 1b. Many oil molecules, like isobutene (10) as shown in FIGS. 1a and 2 methyl propene (12) as shown in FIG. 1b, are branched, asymmetric molecules having different bond strengths between the various radicals and atoms. It is well known in the art that multiple bonds have a higher bond strength than single bonds. As a result, the most probable sequence of events is that the single bonds would be broken prior to the double bonds. For example, the alkyl group $CH_3$ (13) on isobutene molecule (10) is single-bonded to the carbon chain. In high electric fields, alkyl group $CH_3$ (13) will be separated from the main carbon chain and absorbed in the oil as a gas. Similarly, while the alkyl group $CH_2$ (14) on the isobutene molecule (10) is double-bonded to the main chain, ultimately it would also be separated from the carbon chain during corona. At such time when the double bonds are broken, the associated radical group would also be absorbed into the oil as a gas.

Similarly, first the single bonded alkyl group of the embodiment of FIG. 1b would also be broken and absorbed, followed by the breakdown of the remainder of the structure.

Another example is the toluene molecule (20) shown in FIG. 2. The toluene molecule (20) is a ring structure and a member of the Aromatic Family. The ring structure can have asymmetric groups attached like the $CH_3$ group (21) and the single bonded hydrogen atoms (22). The $CH_3$ radical (21) and the single bonded hydrogen atoms (22) are subject to stripping from the main molecule in high electric fields, leaving behind a charged molecule. Charged molecules, radicals, and atoms can recombine to form other molecular components or compounds that act as contaminating agents in the oil, making the oil more susceptible to corona. The $CH_3$ radical (21) may actually recombine with the free hydrogen (22) to form $CH_4$, methane. The free hydrogen atoms (22) may also combine to form molecular hydrogen. Other combinations of free radicals and atoms can and will form other contaminating agents.

This invention recognizes that regenerating spent oil by evacuating corona by-products and other contaminants of a gaseous nature and filtering particulate can improve the CIV and dielectric strength of the reprocessed oil to above that of new oils. The mechanism by which this improved performance is believed to result is that stressing the oil causes those bonds which are disposed towards breakdown to do so, and the cleaning process then removes them, with the remaining oil being less disposed towards breakdown. Repeated applications of the cycle only heightens the effect, and improves the oil against further breakdown.

In one test of this invention, new insulating oil from a high voltage transformer winding was cycled through a sequence of high voltage shots until visible partial discharges occurred. The transformer winding was a spiral strip type with mylar/paper insulation. It was placed in a transparent container and vacuum impregnated with transformer oil. The assembly was then placed in a pulse tank where the winding could be observed. For experimental purposes, breakdown of the oil was defined as the point in time when partial discharge was bright and well developed. The transformer was cycled by applying a 200 kV pulse, hereafter defined as a shot, in a repetitive fashion to a center winding with the external primary turn and grading rings held at ground. For the spacing of the electrodes formed by the transformer, the amplitude of applied voltage was much greater than the CIV of the oil, in order to induce corona. Dielectric deterioration of the oil was determined by observing visible corona which appeared as a visible discharge in the oil.

Testing consisted of a series of runs at a pulse repetition rate of 25 Hz to observe the onset of partial discharges, which typically originated around the external grading rings and were initially visible as faint, intermittent streamers on the surface of the insulation around the rings. The pulse count when small streamers first became visible was recorded as the approximate number of shots for a given test run. Allowing the test to continue for another 2000 to 3000 shots resulted in growth of the streamers until they became bright and filled the margins.

Oil was regenerated using a batch regeneration system. The transformer containing the spent oil was heated by heating tape wrapped around the transformer winding. The pulse tank was then closed and evacuated, while at the same time the transformer and spent oil were maintained at an elevated temperature in a range of about 40–50 C. The regeneration process could be completed at room temperature, but is less effective than the regeneration process done at elevated temperatures. At about 300 torr the oil began to vigorously bubble. Bubbling in oil under vacuum is indicative of dissolved gases in the oil, such as corona by-products. Therefore, when the bubbling is no longer visible the corona by-products have been removed. The pressure was ultimately lowered to approximately 2 torr, which was the lower limit of the vacuum system. A pressure lower than 2 torr could be used during the regeneration process depending on the vacuum system with similar results. The oil was maintained under vacuum until such time as there was no visual signs of bubbling.

Using a sample of the regenerated oil, a DC breakdown test was done according to the ASTM 877 standard test procedure, which requires application of a voltage across a 0.1 inch gap. As a comparison, new oil typically has a dielectric strength in the range of 30 to 34 kV breakdown across this gap. Reprocessing and regeneration of the spent oil increased the dielectric strength to about 40–44 kV over several reprocessing cycles. After testing the oil, the transformer with the regenerated oil was placed back in the high voltage test fixture and repetitive high voltage shots were applied again. The sequence of repetitive high voltage shots, breakdown, and regeneration, was repeated multiple times.

Table I is a summary of the test data for the test sequence described. From Table I it can be seen that evacuating the insulating oil to remove gaseous contaminates substantially increases the number of shots the oil can see between dielectric breakdowns. This can be translated to time and be interpreted as extending the useful life of the oil as well as extending the time between required regeneration processes. Additionally from Table I it can be seen that the regeneration process as described herein, at a minimum doubles the time between breakdowns for each regeneration cycle.

duced by a pulse generator (45) are applied to a conical steel brush (44) to produce large volumes of partial discharges in an oil volume between the free ends of the brush bristles (46) and the spaced electrical ground surface (43). The steel brush (44), which may be of a commercially available type conventionally utilized in rotating machinery such as an electric drill to remove paint from a surface, is advantageous for this application because it provides a plurality of discrete points facing ground surface (43) to maximize discharge throughout the oil. These many spaced bristle points (46), when electrically excited, are a field enhanced corona generator. A vacuum (42) over the oil container (41) removes the gases as they are formed.

Evidence of the corona conditioning was observed visually through the transparent walls of the oil container used in the test rig. With a beginning condition of dense bubbles from partial discharges in the brush-ground plate gap, the density of the bubble cloud was seen to clear somewhat as the test progressed. The visual clearing of the partial dis-

TABLE 1

CIV and Dielectric strength data

| Time Period (time to breakdown) | Oil Condition (at beginning) | Shots/ Subsequent Action | CIV (kV/cm) | Dielectric Strength (kV ASTM 877) |
|---|---|---|---|---|
| $t_0$ 17 min. | new, dry & clean | 18,000 (light discharge) 20,000 (bright well developed discharge)/reprocess | 70 | 30 |
| $t_1$ 34 min. | evacuated, dry | 38,000 (light discharge) 40,000 (bright, well developed discharge)/reprocess | 80 | 34 |
| $t_2$ 75 min. | evacuated, dry | 85,000 (light discharge) 90,000 (bright, well developed discharge)/reprocess | 90 | 37 |
| $t_3$ 4 hrs, 45 min. | evacuated, dry | 300,000 (light discharge) 320,000 (bright, well developed discharge)/reprocess | 100 | 38 |
| $t_4$ 7 hrs | evacuated, dry | 500,000 (no visible discharge)/ terminate test | >120 | 44 |

FIG. 3 schematically shows the effect on the dielectric strength and CIV for sequential regeneration cycles of the tests of Table 1. In FIG. 3, the x axis represents both the time between breakdowns $t_n$ and number of shots ($N_n$), while the y axis represents electric field strength and the ASTM Test Voltage. It can be seen that the process of this invention increases the CIV (31) and dielectric strength (32) of the oil with each regeneration cycle. From FIG. 3 it can be seen that both CIV and dielectric strength increase to some maximum over a number of regeneration cycles. The CIV and dielectric strength increase approximately 10–20 percent per regeneration cycle. Over many regeneration cycles the CIV can be increased by 50 to 100 percent.

Further experiments using highly stressed transformer windings have shown that regenerated oil is more corona resistant than new oil used in the same transformer winding. Additionally, regenerating the oil at least doubled the useable life span of the oil before regeneration was required again. Subsequent cycles of regeneration and reuse of the oil has been shown to continuously improve from the dielectric strength and corona resistance of the oil using the apparatus as described herein. Naturally, the extended life of the oil is advantageous from environmental viewpoints, as the amount of oil that must be replaced will be greatly reduced by the use of the invention.

Figure 4:
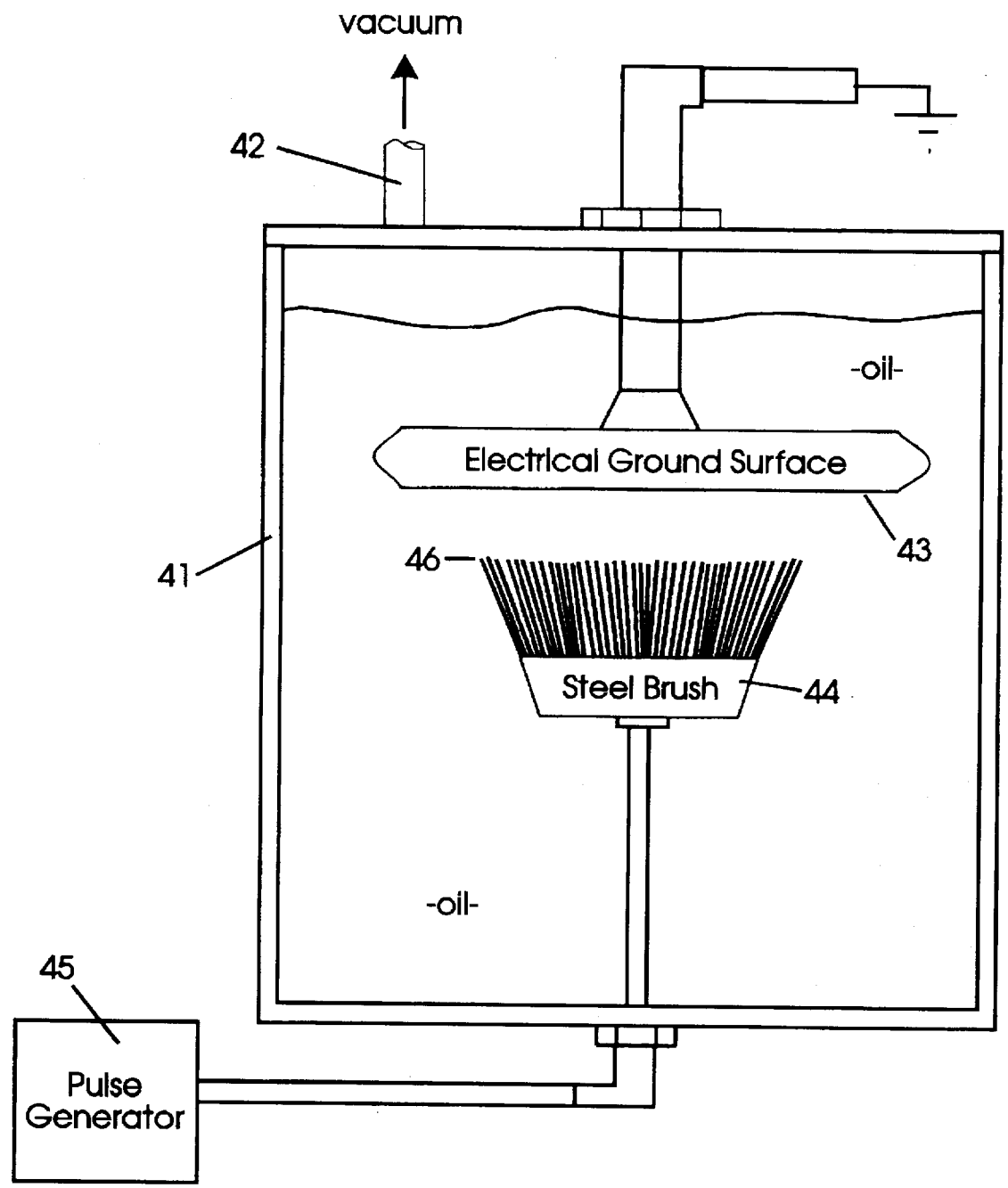
FIG. 4 shows a schematic of the oil preconditioning apparatus.

An embodiment of the invention, as shown in FIG. 4, facilitates preconditioning the oil. High voltage pulses procharges after a period of pulsing was taken as a positive indication that the oil was undergoing a conditioning process. This conclusion is confirmed by the fact that when the voltage was raised slightly, the bubble cloud density increased significantly. When it was lowered, the cloud cleared almost completely.

These results, in conjunction with the results from the first test using the transformer windings, demonstrate that the apparatus described in the present invention can be used to restore spent oil to new or better than new condition, or to precondition new oils through corona generation and evacuation in order to significantly increase the oil corona inception voltage and dielectric strength. These increases in CIV and dielectric strength of the insulating oil and the corresponding increase in the service life of the oil opens the possibility of designing longer life, high power components or components that will be able to withstand higher electrical stresses.

What is claimed is:

1. A method for increasing the useful life expectancy of insulating oils to be utilized in high voltage, high power apparatuses, which comprises:
   a) placing insulating oil in a device constructed and arranged to provide repetitive high voltage shots to the oil, wherein said device is separate and distinct from said high power apparatus;
   b) exposing the oil to a sufficient number of shots to form contaminating byproducts, wherein the voltage exceeds the corona inception voltage of the oil; and c) reprocessing the exposed insulating oil to remove the contaminating byproducts to increase the corona inception voltage of the oil.

2. The method of claim 1, wherein the repetitive high voltage shots are applied to a high voltage electrode in the oil spaced from a return electrode in the oil, wherein dielectric deterioration is determinable by visible discharge in the oil.

3. The method of claim 2, wherein the oil does not fill the container, and step (c) consists of applying a vacuum to the space above the oil, and step (b) occurs concurrently with step (c).

4. The method of claim 1, wherein the reprocessing step includes heating the electrically exposed insulating oil to an elevated temperature.

5. The method of claim 4, wherein the elevated temperature is in the range of about 40° to 50° C.

6. The method of claim 1, wherein the reprocessed insulating oil is evacuated in a pressure range of about 300 torr to 2 torr.

7. The method of claim 6, wherein the reprocessed insulating oil is evacuated at about 2 torr or less.

8. The method of claim 7, wherein the reprocessed insulating oil is evacuated until substantially all corona by-products are removed.

9. The method of claim 1, wherein the reprocessed insulating oil has a useful service life approximately twice that of new insulating oils.

10. The method of claim 1, wherein steps (b) and (c) are repeated at least one more time.

* * * * *